United States Patent
MacPhee

(10) Patent No.: US 10,818,949 B2
(45) Date of Patent: Oct. 27, 2020

(54) PROTON CONDUCTING MEMBRANE AND FUEL CELL COMPRISING THE SAME

(71) Applicant: Enocell Limited, Newhouse (GB)

(72) Inventor: Donald MacPhee, Newhouse (GB)

(73) Assignee: Enocell Limited, Newhouse (GB)

(*) Notice: Subject to any disclaimer, the term of this patent is extended or adjusted under 35 U.S.C. 154(b) by 132 days.

(21) Appl. No.: 15/126,720

(22) PCT Filed: Mar. 24, 2015

(86) PCT No.: PCT/GB2015/050874
§ 371 (c)(1),
(2) Date: Sep. 16, 2016

(87) PCT Pub. No.: WO2015/145135
PCT Pub. Date: Oct. 1, 2015

(65) Prior Publication Data
US 2017/0092974 A1    Mar. 30, 2017

(30) Foreign Application Priority Data
Mar. 24, 2014  (GB) .................................. 1405204.7

(51) Int. Cl.
| H01M 8/04 | (2016.01) |
| H01M 8/1039 | (2016.01) |
| H01M 8/0668 | (2016.01) |
| H01M 8/1051 | (2016.01) |
| H01M 8/0662 | (2016.01) |
| H01M 8/1018 | (2016.01) |

(Continued)

(52) U.S. Cl.
CPC ....... *H01M 8/1039* (2013.01); *H01M 8/0668* (2013.01); *H01M 8/0681* (2013.01); *H01M 8/1051* (2013.01); *H01M 4/9016* (2013.01); *H01M 4/92* (2013.01); *H01M 2008/1095* (2013.01); *H01M 2300/0082* (2013.01)

(58) Field of Classification Search
CPC .................................. H01M 8/04; H01M 8/06
See application file for complete search history.

(56) References Cited

U.S. PATENT DOCUMENTS

| 8,501,366 | B1 * | 8/2013 | Song | ................... | H01M 8/1016 |
| | | | | | 429/483 |
| 2006/0246342 | A1 * | 11/2006 | MacPhee | ............ | H01M 8/0606 |
| | | | | | 429/454 |

(Continued)

FOREIGN PATENT DOCUMENTS

JP    2003272660    9/2003

OTHER PUBLICATIONS

Remediation of 2,4-dichlorophenol contaminated water by visible light-enhanced WO3 photoelectrocatalysis. Scott-Emuakpor, E. O., et al., Applied Catalysis B: Environmental, Elsevier, Amsterdam, NL, vol. 123, May 9, 2012, pp. 433-439.

*Primary Examiner* — Olatunji A Godo
(74) *Attorney, Agent, or Firm* — Dorton & Willis LLP; Ryan Willis

(57) ABSTRACT

A proton conducting membrane (16) for a fuel cell comprises light-transmissive proton conducting material (102, 104) and light scattering material (106) for scattering light within the membrane, the membrane further comprising a light guide (108) through which light can enter the membrane. Also disclosed is a fuel cell comprising the membrane.

25 Claims, 3 Drawing Sheets

(51) Int. Cl.
*H01M 4/90* (2006.01)
*H01M 4/92* (2006.01)

(56) References Cited

U.S. PATENT DOCUMENTS

| | | | |
|---|---|---|---|
| 2007/0054802 A1* | 3/2007 | Giaquinta | B01J 23/898 502/326 |
| 2007/0231624 A1 | 10/2007 | McMahon | |
| 2012/0282542 A1* | 11/2012 | Kruth | H01M 4/8605 429/514 |

* cited by examiner

PROTON CONDUCTING MEMBRANE AND FUEL CELL COMPRISING THE SAME

The present invention relates to a proton conducting membrane, and a fuel cell comprising the same.

Fuel cells are electrochemical cells in which an energy change, resulting from a fuel oxidation reaction, is converted into electrical energy. In this respect, a fuel cell consists of three principal components, namely an anode, a proton conducting membrane, and a cathode. Fuel in the form of, for example, hydrogen or an organic material, is delivered to the anode of the fuel cell where it is oxidised. Hydrogen, either used directly as the fuel or derived from the breakdown of the organic material, then dissociates at the anode of the fuel cell into protons and electrons. The protons are conducted through the proton conducting membrane to the cathode, whilst the electrons travel around an external load circuit to the cathode, thus creating a current output for the cell. An oxidant in the form of air, oxygen enriched air, or oxygen itself, is delivered to the cathode, where it is reduced by means of a chemical reaction with the protons and electrons to form water.

Some fuel cells require operation at high temperatures (e.g. between 600 and 1000° C.) to break down fuel in the manner required. However, heating to such high temperatures is not appropriate for certain applications where a fast start time is required, for example when the fuel cell is used to power a vehicle. Additionally, operation at high temperatures wears out the fuel cell components and the gas sealing quickly and so high temperature fuel cells tend not to be particularly durable.

Low temperature fuel cells, for example Proton Exchange Membrane Fuel Cells (PEMFCs), Direct Methanol Fuel Cells (DMFCs) and Direct Ethanol Fuel Cells (DEFCs), are typically operated at temperatures ranging from room temperature up to 80° C., although some are capable of operation up to a temperature of 200° C. Such low temperature fuel cells have the advantage of short start-up times and long durability. Additionally, PEMFCs have the advantage of being generally smaller and lighter than high temperature fuel cells.

Oxidation of hydrogen or hydrocarbons at the anode of a PEMFC at low temperatures can be assisted by a noble metal catalyst (typically platinum) provided at the anode. However, a problem associated with PEMFCs is the strong adsorption of the contaminant carbon monoxide at the catalyst-anode surface. Carbon monoxide is derived from the breakdown of organic fuels such as methanol or ethanol in the anode chamber, or from carbon monoxide contaminated hydrogen as hydrogen derived from reformed hydrocarbons can contain more than 100 ppm carbon monoxide. In high temperature fuel cells, such carbon monoxide is usually readily oxidised to carbon dioxide, which is easily desorbed from the electrode surface. However, as oxidation of carbon monoxide to carbon dioxide is less efficient at low temperatures, carbon monoxide is adsorbed at the catalyst-anode surface of low temperature fuel cells, thus blocking the active sites for the hydrogen oxidation reaction at the anode. Although noble metal catalysts such as platinum effectively catalyse the dissociation of hydrogen, their functionality with regard to the oxidation of carbon monoxide is limited. The blocking of the active sites for hydrogen oxidation leads to a significant decrease in cell performance over time.

Various methods for the removal of carbon monoxide from the anode of a low temperature PEMFCs have been explored.

One such method has involved pulsing cell voltage during operation. However this method has been found to disrupt the energy output from the cell, which is not desirable if a constant energy output is required.

Another method has involved bleeding air to the anode. However this significantly reduces the open cell potential and therefore decreases cell performance.

Yet another approach has been to use a bimetallic catalyst comprising a noble metal and a non-noble metal, such as an alloy of platinum and ruthenium. However this was found not to prevent electrode poisoning at carbon monoxide concentrations greater than 25 ppm. Other bimetallic or ternary catalysts, such as Pt/Ni, Pt/Co, Pt/Ru/Ni and Pt/Ni/Co, have been investigated. However, in such systems the non-noble alloying metal has to display a number of characteristics: as Nafion® (a copolymer of tetrafluoroethylene and perfluoropolyether sulfonic acid) is often used in the proton conducting membrane, thus creating a strong perfluorosulphonic acidic environment, the non-noble metal must be stable in this environment; also the non-noble metal must possess low activation energies for the water dissociation reaction and the formation of COOH from adsorbed CO and adsorbed OH.

A known method of increasing the efficiency of fuel cells by providing an improved level of tolerance to the contamination of the anode by carbon monoxide comprises providing a photo-catalyst for enhancing contaminant carbon monoxide oxidation upon irradiation by incident light.

For example, WO 2004/079847 discloses a fuel cell in which the anode is photocatalyst-assisted so as to be receptive to light, wherein the proton conductive membrane is light-transmissive such that light passes through the membrane as a final stage in an optical path to the photocatalyst. The proton conductive membrane may be used as a waveguide and might achieve this function as an optical path through appropriate modifications to the structure of the membrane or the use of supplementary "light pipes" within the membrane. For example, the refractive index characteristics of the membrane might be specifically selected for this purpose, or "light pipes" of pieces or fibres of glass with different refractive indices might be used or light scattering particles distributed throughout the membrane might be used to achieve the optimum flux of light onto the anode surface. This document discloses that suitable "light pipes" might be incorporated in the membrane or on the surfaces of the anode contiguous with the membrane in order to deliver sufficient light to the photo-catalytic surface.

WO 2011/048429 discloses an anode assembly for a fuel cell having an anode catalyst component comprising a photocatalyst for enhancing contaminant carbon monoxide oxidation upon irradiation by incident radiation, the anode assembly further comprising a flow plate incorporating a light source for providing incident radiation, at least a section of the flow plate being porous to light radiation for enabling irradiation of said photocatalyst through the flow plate, the flow plate also having a flow guide surface shaped to form a plurality of channels for directing fuel within the anode chamber.

The present invention seeks to provide an improved proton conducting membrane and a fuel cell comprising the same for reducing carbon monoxide contamination at the anode, thus improving fuel cell efficiency.

According to the present invention in a first aspect there is provided a proton conducting membrane for a fuel cell, the membrane comprising light-transmissive proton conducting material and light scattering material for scattering light within the membrane, the membrane further comprising a light guide through which light can enter the membrane.

The proton conducting membrane of the present invention is for use within a fuel cell comprising a photocatalyst to provide improved irradiation of the photocatalyst. The proton conducting membrane may be connected to a light source, such as a light collector or generator (e.g. a lens, such as a Fresnel lens, a reflective surface, an LED or other light source), so as to allow light to enter the membrane through the light guide. The light scattering material ensures a more homogenous scattering of the light throughout the membrane. The proton conducting material is light-transmissive so that the homogenously scattered light can be used to irradiate the photocatalyst at the anode of the fuel cell to provide improved irradiation of the photocatalyst without the need for an internal light source.

The proton conducting membrane of the present invention thus comprises a light transmissive proton conducting material. The proton conducting membrane is used to conduct protons from the anode to the cathode of a fuel cell, and the material from which it is formed may be any suitable material used in the art for conducting protons. For example, a preferred proton conducting material is Nafion®, which is a copolymer of tetrafluoroethylene and perfluoropolyether sulfonic acid, although other suitable materials may be used, such as proton conducting glass (e.g. a high conductivity glass having a composition 5% $P_2O_5$:95% $SiO_2$).

The proton conducting membrane of the present invention further comprises light scattering material for scattering light within the membrane. The light scattering material may be any material which is suitable for the purpose, for example a material which alters the refractive index of the proton conducting material, and preferably comprises light scattering particles which are dispersed throughout the proton conducting membrane.

The light scattering particles may be made from any suitable material, including oxides such as silica, alumina, and titania, with silica being a preferred material. Those skilled in the art will appreciate that the light scattering characteristics of the light scattering particles will depend upon the particle size and the concentration of the particles within the proton conducting material. A preferred particle size for the light scattering particles is from 10-50 nm, more preferably 10-20 nm (e.g. 15-20 nm). Particles of this size are sometimes referred to as nanoparticles, and have a particle size smaller than the shortest wavelength of visible light.

The concentration of light scattering particles within the proton conducting materials may be chosen to ensure that the light entering the membrane from the light guide is optimally scattered. For this purpose, scattering media concentrations may vary as will be appreciated by those skilled in the art.

The light scattering particles may be incorporated within the proton conducting material during the process of forming the proton conducting membrane. For example, with the preferred proton conducting material Nafion®, light scattering particles, such as nanosilica particles, may be mixed into a liquid Nafion® paste (e.g. as a colloidal dispersion) from which a single-sheet Nafion® proton conducting membrane may be formed, which incorporates the light scattering particles dispersed therein. Alternatively, a plurality of sheets of proton conducting material may be used in the proton conducting membrane. Thus, the light scattering particles may be mixed into a Nafion® paste which can act as a binder between two Nafion® sheets, i.e. the Nafion® sheet containing the light scattering particles is sandwiched between two standard Nafion® sheets. Standard Nafion® sheets for use as proton conducting membranes in fuel cells typically have a thickness of from 10-100 μm, for example from 50-75 μm (e.g. approximately 65 μm).

The proton conducting membrane of the present invention further comprises a light guide through which light can enter the membrane. The light guide may comprise a sheet of light transmissive polymer material, for example a sheet formed from a polymer selected from polyethyleneterepthalate (PET), polyethylene (PE), polymethylpentene (PMP, such as TPX®), and mixtures and copolymers thereof. The light guide is optically coupled to the proton conducting material comprising the light scattering material, so that light from an external source can pass through the light guide into the proton conducting membrane. For example, the light guide may be mounted onto the proton conducting material outside of the area of the proton conducting material which will be active for proton conduction within a fuel cell, on one or a plurality of sides.

In preferred embodiments, the light transmissive polymer sheets forming the light guide are preferably silvered on either or, more preferably, both sides, to minimise light leakage. Silvering of the polymer sheet may be performed by processes and using materials known in the art, for example by vapour deposition of aluminium.

The components forming the proton conducting membrane of the present invention, i.e. proton conducting material, light scattering material and light guide, may be held in operative positioning together by one or more gaskets. Thus, in preferred embodiments, the proton conducting membrane has a layer structure in which either a single-sheet proton conducting material containing the light scattering material, or a multilayer proton conducting material in which, for example, a Nafion® sheet containing the light scattering particles is sandwiched between two standard Nafion® sheets, is optically coupled to a silvered light transmissive polymer sheet on one or more sides of the proton conducting material, held between gaskets. The gaskets may be bonded to each other through gaps, such as perforations, in the light guide(s), if necessary.

The proton conducting membrane is for connection to a light source, such as a light collector or generator (e.g. a lens, such as a Fresnel lens, a reflective surface, an LED or other light source), so as to allow light to enter the membrane through the light guide. The light is then scattered by the light scattering material, and is for use in irradiating the photocatalyst of a fuel cell.

According to the present invention in a second aspect there is provided a fuel cell comprising an anode for the oxidation of fuel to generate protons, a cathode for the oxidation of protons with oxygen, a proton conducting membrane for conducting protons from the anode to the cathode, and at least one gas diffusion layer for diffusion of the fuel and/or oxygen prior to reaction at the anode and/or cathode respectively, wherein the anode comprises a catalyst component comprising a fuel catalyst and a photocatalyst, the photocatalyst being provided for enhancing contaminant carbon monoxide oxidation upon irradiation by incident light, and the anode further comprises a current collecting component for conducting electrical current, and the proton conducting membrane is light transmissive for allowing light from a light source to be transmitted through the proton conducting membrane for illuminating the photo-catalyst.

The proton conducting membrane used in the fuel cell of the second aspect of the invention is preferably a membrane according to the first aspect of the invention.

Current low temperature fuel cells rely on the use of very pure hydrogen, or fuels that have been pre-purified, as the source of fuel. The provision of a photocatalyst for enhancing contaminant carbon monoxide oxidation allows for the creation of a low temperature fuel cell with a carbon monoxide tolerant anode assembly. Such a cell can thus utilise hydrocarbon gas or liquids such as methanol or ethanol as the source of fuel without the need for purifiers and/or reformers. This reduces the bulk and operating cost of such low temperature fuel cells. The precious metal catalyst loading is also reduced, which significantly decreases fuel cell costs. In addition, the arrangement of the present invention exhibits an increased cell efficiency when used in a direct ethanol fuel cell.

Fuel cells according to the present invention may find application in a number of devices where carbon contaminated hydrogen or hydrocarbon fuels are presently used as fuels for energy generation. Possible uses are for complementation or replacement of batteries, diesel generators or combustion engines in small portable devices, light and heavy-duty vehicles, and back-up or remote stationary power devices, thus allowing the use of cells in markets such as portable electronics, transport and small stationary power generation.

The fuel cell of the second aspect of the present invention may comprise components which are known and familiar to persons skilled in the art.

Thus, the anode fuel catalyst is preferably a noble metal catalyst, for example a catalyst comprising platinum.

The anode photocatalyst may comprise a photocatalytically active metal oxide, or a material derived from a photocatalytically active metal oxide. The metal oxide may for example be a tungsten oxide, titanium oxide, molybdenum oxide, or iron oxide. A preferred material is tungsten oxide.

The anode may thus comprise a catalyst layer comprising a composite consisting of photocatalyst nanoparticles, such as tungsten oxide, and a nano-sized platinum catalyst on a suitable support, for example a carbon support, with a tungsten oxide to platinum mass ratio preferably in the range of 1:99 to 99:1, more preferably in the range of 80:20 to 95:5, and most preferably in the range of 70:30 to 90:10.

Suitable cathodes for use in the fuel cell of the second aspect of the present invention will be known to persons skilled in the art, and may include for example a mesh, porous element, or perforated strip, and may be made from a noble metal (e.g. platinum or silver) or catalytic metals or alloys known in the art.

The fuel cell of the second aspect of the present invention comprises at least one gas diffusion layer for diffusion of the fuel and/or oxygen prior to reaction at the anode and/or cathode respectively. Gas diffusion layers are typically porous materials, for example composed of a dense array of carbon fibres such as carbon cloth and carbon paper, and assist in providing a pathway for fuel and/or oxygen to the anode and/or cathode respectively, can help to remove water, conduct electrons, transfer heat, and provide additional mechanical strength.

The fuel cell of the second aspect of the present invention may comprise a flow plate for assisting flow of fuel and/or oxygen to the anode and/or cathode respectively.

The fuel cell of the second aspect of the present invention may comprise one or more bipolar plates. These are multi-functional components within a fuel cell. For example, they can connect and separate individual fuel cells when used in a stack (see below), aid with the distribution of fuel gas and oxygen over the active surface of the catalysts and proton conducting membrane, and can conduct electrical current from the anode to the cathode (within an individual cell, or between cells in a stack). Bipolar plates are typically formed from graphite, but may be made from metals such as stainless steel and metal alloys, or polymer composites.

It is important that electrons generated at the anode can be conducted from the anode to the cathode. In preferred embodiments the need for additional conductive elements is avoided as the standard fuel cell architecture is used, comprising a noble metal catalyst and a photocatalyst supported on a conductive support (e.g. carbon), distributed on either side of the proton conducting membrane and being in intimate contact with one or more gas diffusion layers (described in more detail below) and in turn, conductive graphite bipolar plates. In this way, the need for illumination windows and consequently, additional conductive elements, is eliminated. However, an additional current collector may be provided if necessary. For example, an additional current collector may comprise a metallic mesh. Alternatively, the current collector may comprise a plurality of substantially parallel metallic wires or strands, for example a gold-coated material, titanium, nickel or chromium, or a platinum-coated material. Alternatively, the current collector may comprise a metallic foam such as nickel foam. As a further alternative, the current collector may comprise a metal-coated or carbon-coated polymer cloth.

A higher output may be achieved from the fuel cell of the second aspect of the present invention by using a plurality of fuel cells in series, for example in stacks of fuel cells.

The present invention will now be described in detail, by way of example only, with reference to the accompanying drawings, in which.

Figure 1:
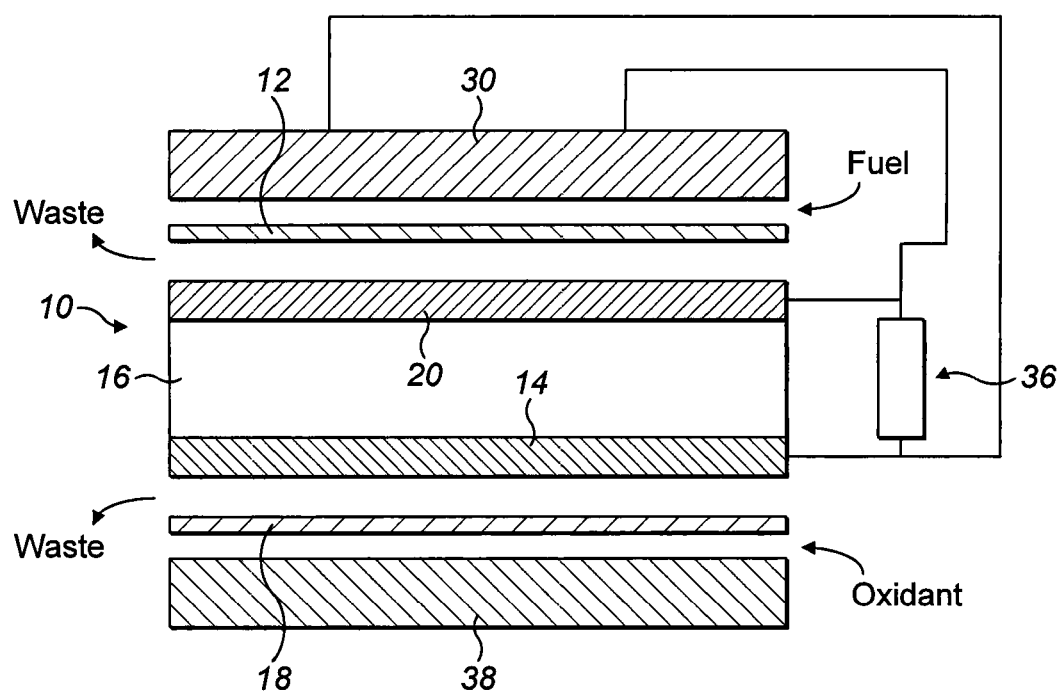
FIG. 1 shows a general configuration of a fuel cell according to an embodiment of the present invention.
Figure 2:
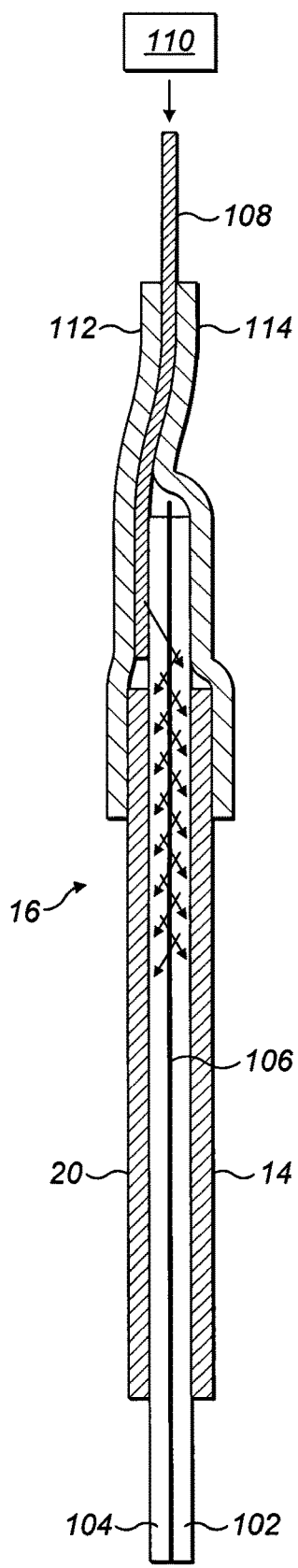
FIG. 2 shows a side view of an embodiment of a proton conducting membrane according to the present invention.
Figure 3:
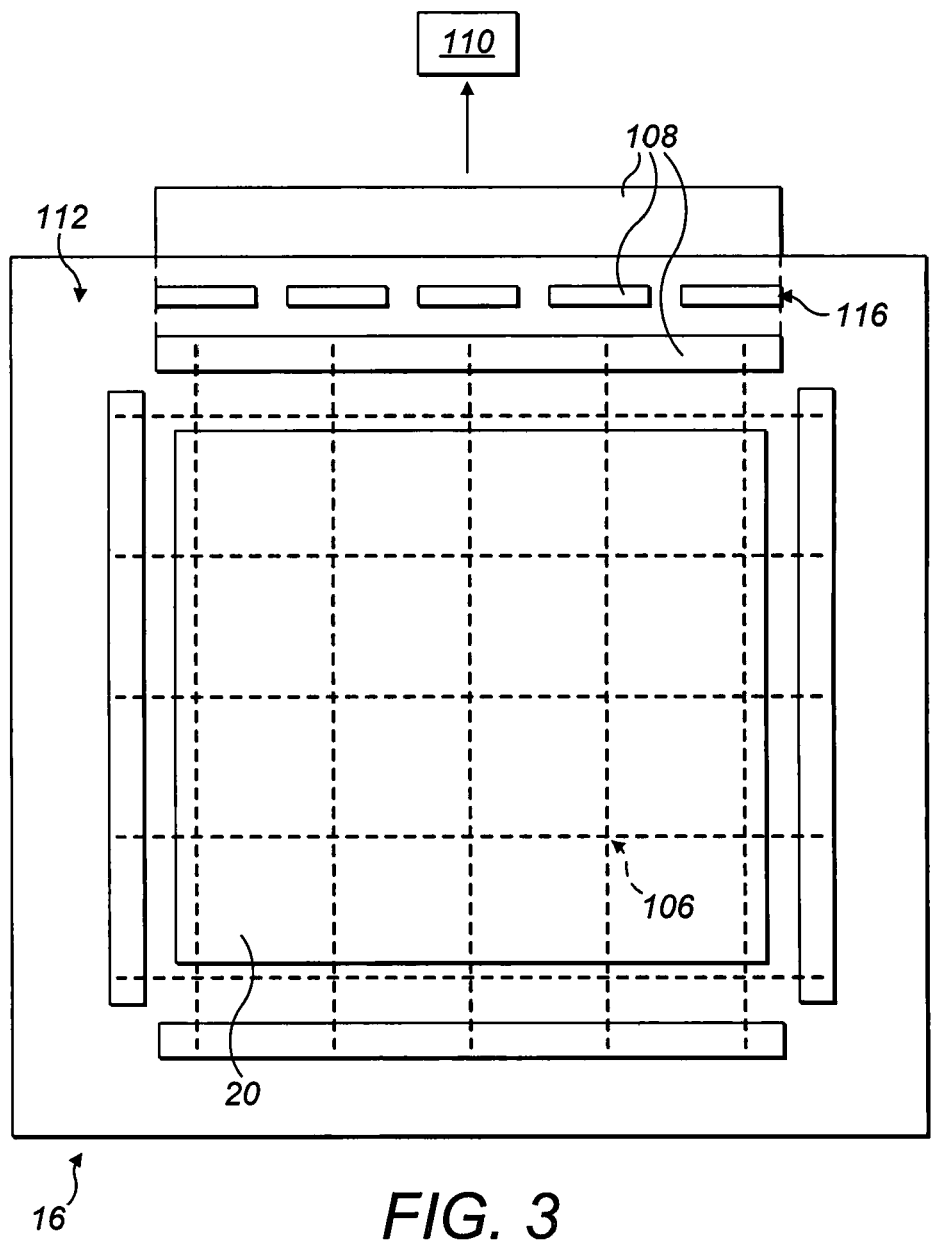
FIG. 3 shows a plan view of the embodiment shown in FIG. 2.

The general configuration of a fuel cell 10 according to the present invention can be seen in FIG. 1, with the more detailed structure of the proton conducting membrane 16 being shown in FIGS. 2 and 3. It is to be understood that FIG. 1 shows no detail of the proton conducting membrane 16 and is merely intended to show the general position of the proton conducting membrane 16 within the fuel cell 10.

Referring to FIG. 1, the fuel cell 10 comprises an anode 20 and a cathode 14, with the proton conducting membrane 16 located between and in contact with both the anode 20 and the cathode 14. The proton conducting membrane 16 is described in detail below with reference to FIGS. 2 and 3.

The fuel cell 10 further comprises a gas diffusion layer 12 adjacent the anode 20 for diffusion of the fuel prior to reaction at the anode 20, and a further gas diffusion layer 18 adjacent the cathode 14 for diffusion of the oxidant prior to reaction at the cathode 14. Gas diffusion layers are typically porous materials, for example composed of a dense array of carbon fibres such as carbon cloth and carbon paper, and assist in providing a pathway for fuel and/or oxygen to the anode and/or cathode respectively, can help to remove water, conduct electrons, transfer heat, and provide additional mechanical strength.

The fuel cell 10 also comprises conductive graphite bipolar plates 30 and 38 for assisting flow of fuel and oxidant respectively to the anode 20 and to the cathode 14, and for conducting current from the anode 20 to the cathode 14 (or between the anode and cathode of different fuel cells used in a stack).

The anode 20 comprises a gas permeable catalyst layer in fluid communication with the proton conducting membrane 16. In preferred embodiments, the anode 20 comprises a platinum catalyst and a tungsten oxide visible light responsive photocatalyst. The anode 20 may comprise a composite consisting of tungsten oxide photocatalyst nanoparticles and nano-sized platinum catalyst on a carbon support, with a tungsten oxide to platinum mass ratio in the range of 1:99 to 99:1, preferably in the range of 80:20 to 95:5, and most preferably in the range of 70:30 to 90:10.

In use, fuel gas is delivered to the anode 20 via the gas diffusion layer 12, with the flow of fuel being directed by the bipolar plate 30. The fuel may be in the form of pure hydrogen, or a hydrocarbon fuel such as methanol. The hydrogen contained in the fuel is then catalytically split into protons and electrons in the presence of the platinum catalyst, in accordance with Equation 1:

$$2H_2 \rightarrow 4H^+ + 4e^- \quad (1)$$

Once split, the protons permeate through the anode catalyst layer 20 and the proton conducting membrane 16 to gather at the cathode 14.

At the cathode side of the fuel cell 10, an oxidant such as air, oxygen enriched air, or pure oxygen is delivered to the cathode 14, with the flow of oxidant being directed by a bipolar plate 38. This oxidant reacts with the protons which have permeated through the proton conducting membrane 16 and have gathered at the cathode 14, to form water in accordance with Equation (2):

$$4H^+ + 4e^- + O_2 \rightarrow 2H_2O \quad (2)$$

Meanwhile, the electrons are collected and delivered to the external load circuit 36. This flow of electrons provides the current which forms the energy output of the fuel cell 10. The bipolar plates 30 and 38 carry the current from the anode 20 to the cathode 14, but an additional current collector may be provided if necessary. For example, an additional current collector may comprise a metallic mesh.

As described above, contaminant carbon monoxide may be present at the anode 20 as a result of the breakdown of the fuel, or from the use of carbon monoxide contaminated hydrogen as the fuel. In order to prevent the adsorption of this carbon monoxide into the anodic catalyst layer 20, which would lead to the blocking of active sites for the hydrogen oxidation reaction of Equation 1, the anode 20 is irradiated by light from an external source which passes through the proton conducting membrane 16, which is light transmissive and described in more detail below with reference to FIGS. 2 and 3. The contaminant carbon monoxide is oxidised to form carbon dioxide, which is sustained by the tungsten oxide in the anode catalyst layer 20 being irradiated. The resultant carbon dioxide can then be easily desorbed from the anode 20 surface, and can be exhausted from the fuel cell 10.

Irradiation of the anode 20 is achieved via the proton conducting membrane 16, shown in more detail in FIGS. 2 and 3.

Thus, FIGS. 2 and 3 show an embodiment of a proton conducting membrane 16 according to the present invention. The proton conducting membrane 16 comprises light-transmissive proton conducting material and light scattering material for scattering light within the membrane 16. In preferred embodiments, the light-transmissive proton conducting material is Nafion®, a copolymer of tetrafluoroethylene and perfluoropolyether sulfonic acid. In the embodiment shown in FIG. 2, the proton conducting membrane 16 comprises two sheets of Nafion® 102 and 104. Each sheet of Nafion® 102, 104 preferably has a thickness of between 50 and 75 µm, more preferably approximately 65 µm. The anode 20 and cathode 14 are shown figuratively in FIG. 2.

Between the two Nafion® sheets 102 and 104 is a light scattering layer 106 which contains the light scattering material for scattering light within the membrane. Preferred light scattering particles are made from silica, and have a particle size of 15-20 nm. However, other materials may be used, for example, oxides such as alumina, and titania, and metals, having different particle sizes as appropriate.

In the light scattering layer 106, the light scattering particles are dispersed within a Nafion® paste which can act as a binder between the two Nafion® sheets 102 and 104. In FIG. 3 the light scattering layer 106 is shown figuratively as a mesh.

The proton conducting membrane 16 further comprises a light guide 108 through which light can enter the membrane from an external light source (indicated by box 110).

The light guide 108 comprises a sheet of light transmissive polymer material, for example a sheet formed from a polymer selected from polyethyleneterepthalate (PET), polyethylene (PE), polymethylpentene (PMP, such as TPX®), and mixtures and copolymers thereof. The light guide 108 is optically coupled to the Nafion® sheet 102, so that light from the external source 110 can pass through the light guide 108 into the proton conducting membrane 16 (as indicated by the arrows in FIG. 2). The light guide 108 is mounted onto the Nafion® sheet 102 outside of the area of the proton conductive material which will be active for proton conduction within the fuel cell 10, i.e. outside the anode and cathode 14. Alternatively, a direct end-to-end abutment of the light guide 108 to the Nafion® sheets 102, 104 and 106 may be used such that light is collimated directly towards the light scattering media in the light scattering layer 106.

The light transmissive polymer sheet forming the light guide 108 is preferably silvered on both sides, to minimise light leakage. Silvering of the polymer sheet may be performed by processes and using materials known in the art, for example by vapour deposition of aluminium.

The components forming the proton conducting membrane 16 of the present invention, i.e. Nafion® sheets 102 and 104, light scattering layer 106 and light guide 108, are held in operative positioning together by gaskets 112 and 114. The gaskets 112 and 114 may be bonded to each other through gaps, such as perforations 116 in the light guide 108. In FIG. 3 the light guide 108 is seen extending from the proton conducting membrane 16 from only one side (i.e. the top side as viewed), but may extend from any or more sides.

In use, the proton conducting membrane 16 is connected to a light source 110, such as a light collector or generator (e.g. a lens, such as a Fresnel lens, a reflective surface, an LED or other light source), so as to allow light to enter the membrane 16 through the light guide 108. The light is then scattered by the light scattering material in light scattering layer 106 for irradiating the photocatalyst of the anode 20 of the fuel cell 10.

It will be understood that the illustrated embodiment described herein shows an application of the invention in one form only for the purposes of illustration. In practice the invention may be applied to many different configurations.

For example, the anode fuel platinum catalyst could comprise any other noble metal, and may be combined with one or more non-noble metals to form, for example, a bi-metallic or tri-metallic catalyst such as Pt/Ru, Pt/Ni, Pt/Co, Pt/Ru/Ni or Pt/Ni/Co. Also, the photocatalyst could comprise any other photocatalytically active metal oxide such as tungsten oxide, titanium oxide or iron oxide, or compounds derived from tungsten oxide, titanium oxide or iron oxide.

The porosity of the anode is preferably in the range 50% to 80%, with the preferred porosity being in the range 60% to 70%. Most preferably, the porosity of the anode is around 65%.

The average particle size of the photocatalyst particles is normally less than 100 nm. In this connection, the average particle size is typically between 5 and 50 nm, and is preferably in the range 10 to 20 nm. The catalyst layer could be formed from a laminated arrangement of carbon, noble metal catalyst, and metal oxide photo-catalyst.

The invention claimed is:

1. A proton conducting membrane for a fuel cell, the membrane comprising light transmissive proton conducting material and light scattering material for scattering light within the membrane, wherein the proton conducting material is optically coupled to a light guide through which light can enter the membrane, and wherein the light guide is mounted onto the proton conductive material outside of the area of the proton conductive material which will be active for proton conduction within a fuel cell, on one or more sides.

2. A proton conducting membrane according to claim 1 wherein the light-transmissive proton conducting material comprises a copolymer of tetrafluoroethylene and perfluoropolyether sulfonic acid.

3. A proton conducting membrane according to claim 1 wherein the light scattering material comprises light scattering particles which are dispersed throughout the proton conducting membrane.

4. A proton conducting membrane according to claim 3 wherein the light scattering particles are made from a material selected from silica, alumina, titania, and metals.

5. A proton conducting membrane according to claim 4 wherein the light scattering particles are made from silica.

6. A proton conducting membrane according to claim 3 wherein the light scattering particles have a particle size of from 10-50 nm.

7. A proton conducting membrane according to claim 6 wherein the light scattering particles have a particle size of from 10-20 nm.

8. A proton conducting membrane according to claim 7 wherein the light scattering particles have a particle size of from 15-20 nm.

9. A proton conducting membrane according to claim 3 comprising a sheet of proton conducting material which incorporates the light scattering particles dispersed therein.

10. A proton conducting membrane according to claim 3 comprising a plurality of sheets of proton conducting material wherein a sheet containing the light scattering particles is sandwiched between sheets of proton conducting material.

11. A proton conducting membrane according to claim 1 wherein the light guide comprises a sheet of light transmissive polymer material.

12. A proton conducting membrane according to claim 11 wherein the light transmissive polymer material is selected from polyethyleneterepthalate (PET), polyethylene (PE), polymethylpentene, and mixtures and copolymers thereof.

13. A proton conducting membrane according to claim 1 wherein the light guide comprises one or more sheets silvered on either or both sides.

14. A proton conducting membrane according to claim 13 wherein the one or more sheets are silvered with aluminium.

15. A proton conducting membrane according to claim 1 which further comprises one or more gaskets on the outside of the membrane.

16. A proton conducting membrane according to claim 15 wherein the proton conducting membrane has a layer structure in which either a single-sheet of proton conducting material containing the light scattering material, or a multilayer proton conducting material in which a sheet of proton conducting material containing light scattering particles is sandwiched between two further sheets of proton conducting material, is optically coupled to a silvered light transmissive polymer sheet on one or more sides of the proton conducting material, held between a gasket on either side.

17. A proton conducting membrane according to claim 16 wherein the gaskets are bonded to each other through gaps in the light guide(s).

18. A fuel cell comprising an anode for the oxidation of fuel to generate protons, a cathode for the oxidation of protons with oxygen, a proton conducting membrane for conducting protons from the anode to the cathode, and at least one gas diffusion layer for diffusion of the fuel and/or oxygen prior to reaction at the anode and/or cathode respectively, wherein the anode comprises a catalyst component comprising a fuel catalyst and a photocatalyst, the photocatalyst being provided for enhancing contaminant carbon monoxide oxidation upon irradiation by incident light, and the anode further comprises a current collecting component for conducting electrical current, and the proton conducting membrane is light transmissive for allowing light from a light source to be transmitted through the proton conducting membrane for illuminating the photo-catalyst, wherein the proton conducting membrane comprises light transmissive proton conducting material and light scattering material for scattering light within the membrane, and wherein the proton conducting material is optically coupled to a light guide through which light can enter the proton conducting membrane.

19. A fuel cell according to claim 18 wherein the proton conducting membrane is according to claim 1.

20. A fuel cell according to claim 18 wherein the anode fuel catalyst is a noble metal catalyst, for example a catalyst comprising platinum.

21. A fuel cell according to claim 18 wherein the anode photocatalyst comprises a photocatalytically active metal oxide, or a material derived from a photocatalytically active metal oxide.

22. A fuel cell according to claim 21 wherein the metal oxide is tungsten oxide.

23. A fuel cell according to claim 18 wherein the anode comprises a catalyst layer comprising a composite consisting of photocatalyst nanoparticles and a nano-sized platinum catalyst on a suitable support.

24. A fuel cell according to claim 18 which comprises a tungsten oxide anode photocatalyst and a platinum anode fuel catalyst in a mass ratio in the range of 1:99 to 99:1, preferably in the range of 80:20 to 95:5, more preferably in the range of 70:30 to 90:10.

25. A fuel cell according to claim 18 which does not comprise an additional current collector.

* * * * *